(12) United States Patent
Fujiyoshi et al.

(10) Patent No.: US 9,156,397 B2
(45) Date of Patent: Oct. 13, 2015

(54) LIGHTING APPARATUS FOR VEHICLE AND METHOD OF CONTROLLING A HEADLAMP

(75) Inventors: Satoshi Fujiyoshi, Nagoya (JP);
Takatoshi Nakagawa, Toyota (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 601 days.

(21) Appl. No.: 13/523,466

(22) Filed: Jun. 14, 2012

(65) Prior Publication Data

US 2012/0250338 A1  Oct. 4, 2012

Related U.S. Application Data

(63) Continuation of application No. PCT/JP2010/070912, filed on Nov. 24, 2010.

(51) Int. Cl.
*B60Q 1/04* (2006.01)
*B60Q 1/14* (2006.01)

(52) U.S. Cl.
CPC .......... *B60Q 1/143* (2013.01); *B60Q 2300/056* (2013.01); *B60Q 2300/41* (2013.01); *B60Q 2300/42* (2013.01)

(58) Field of Classification Search
CPC ....................................... B60Q 1/143
USPC .................. 362/464, 465, 466, 531, 538, 539
See application file for complete search history.

(56) References Cited

U.S. PATENT DOCUMENTS

| | | | |
|---|---|---|---|
| 7,618,173 B2 * | 11/2009 | Sugimoto et al. | 362/539 |
| 2009/0315479 A1 | 12/2009 | Hayakawa | |
| 2010/0060169 A1 * | 3/2010 | Sugimoto et al. | 362/539 |

FOREIGN PATENT DOCUMENTS

| | | |
|---|---|---|
| EP | 2135774 A2 | 12/2009 |
| JP | 2006-273092 A | 10/2006 |
| JP | 2009-227088 A | 10/2009 |
| JP | 2010-000957 A | 1/2010 |
| JP | 2010-162960 A | 7/2010 |

OTHER PUBLICATIONS

International Search Report of PCT/JP2010/070912, dated Feb. 15, 2011.

* cited by examiner

*Primary Examiner* — Y M Lee
(74) *Attorney, Agent, or Firm* — Sughrue Mion, PLLC

(57) ABSTRACT

A lighting apparatus for a vehicle includes headlamps configured to be switchable between high beam and low beam, wherein a direction of an optical axis of each of the headlamps is variable in a substantially horizontal plane by use of a swivel actuator and a controller configured to control the headlamps, wherein if the controller detects a forward vehicle in projection areas of the headlamps, the controller temporarily switches from the high beam to the low beam, then drives the swivel actuator toward a target swivel angle according to a position of the detected forward vehicle and, after finishing driving toward the target swivel angle or during driving toward the target swivel angle, starts projection by the high beam.

9 Claims, 12 Drawing Sheets

FIG.6
(A) 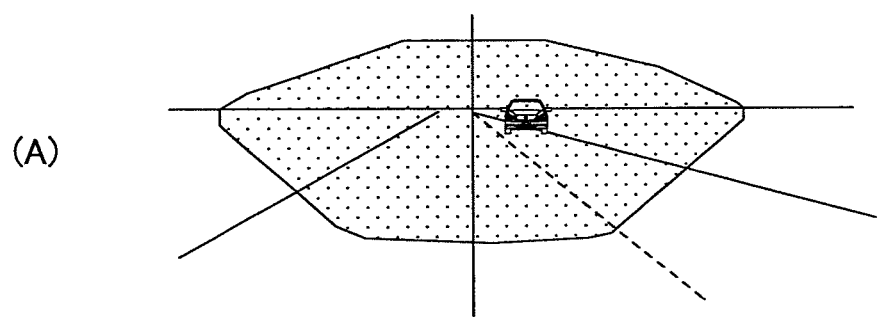
(B) 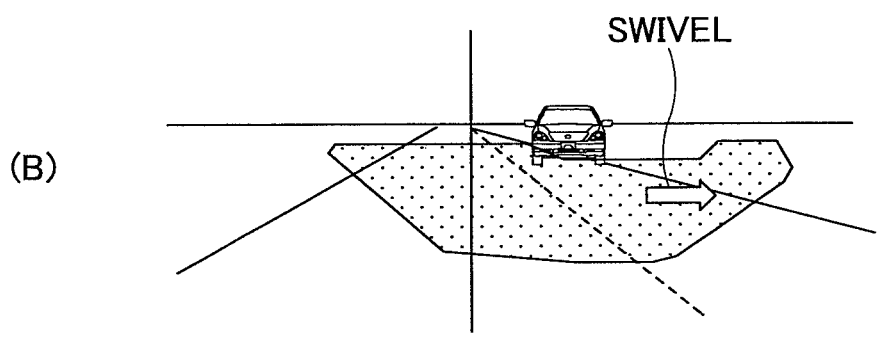
(C) 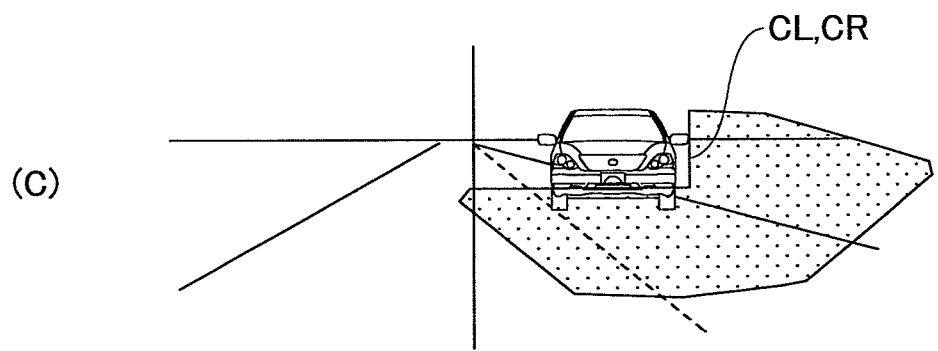

FIG.7
(A)
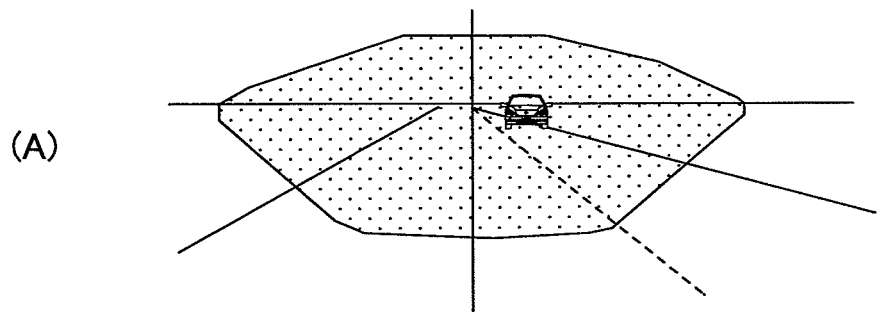
(B)
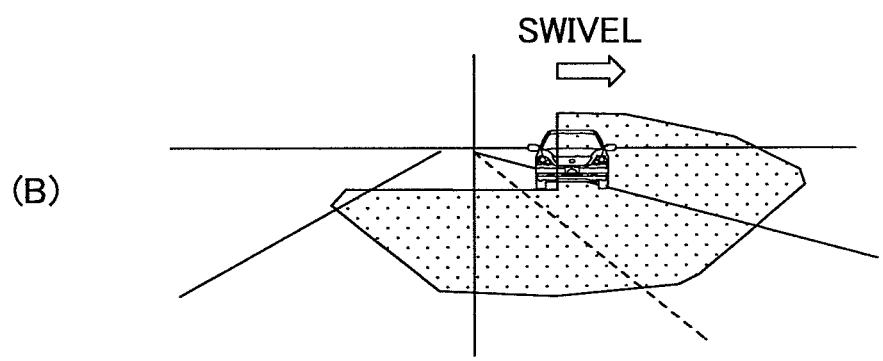
(C)
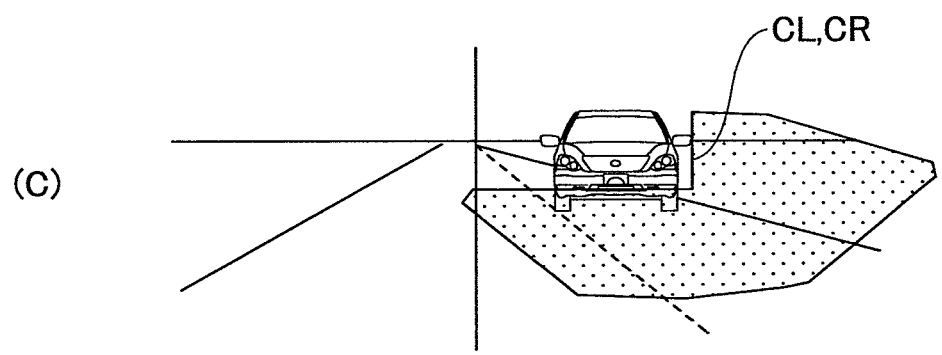

LIGHTING APPARATUS FOR VEHICLE AND METHOD OF CONTROLLING A HEADLAMP

CROSS-REFERENCE TO RELATED APPLICATIONS

This is a continuation of International Application No. PCT/JP2010/070912, filed on Nov. 24, 2010, the entire contents of which are hereby incorporated by reference.

FIELD

The present disclosure is related to a lighting apparatus for a vehicle and a method of controlling headlamps for the vehicle.

BACKGROUND

JP 2010-000957 A discloses a technique in which light distribution patterns for left and right side high beams, which have blocked portions in part with respect to a high beam pattern, can be generated by controlling sub-shades divided into halves in a horizontal direction, and swivel angles of the left side and right side headlamps are adjusted such that positions of vertical cut-off lines of the light distribution patterns for left and right side high beams according to the position of the detected vehicle are implemented.

However, according to the technique disclosed in the above-noted Patent Document 1, if a forward vehicle is detected in projection areas of headlamps, the high beam light included in the light distribution patterns for left and right side high beams may traverse the forward vehicle in the course of an initial adjusting process of changing the swivel angles of the left side and right side headlamps. In this case, there may be glare felt by the driver of the forward vehicle.

Therefore, it is an object of the present invention to provide a lighting apparatus for a vehicle and a method of controlling headlamps for a vehicle which can preferably prevent glare affecting the driver of the forward vehicle in the course of an initial adjusting process of the swivel angle at the time of detecting the forward vehicle.

SUMMARY

In order to achieve the aforementioned objects, according to an aspect of the present invention a lighting apparatus for a vehicle is provided, which includes headlamps configured to be switchable between high beam and low beam, wherein a direction of an optical axis of each of the headlamps is variable in a substantially horizontal plane by use of a swivel actuator; and a controller configured to control the headlamps;

wherein if the controller detects a forward vehicle in projection areas of the headlamps, the controller temporarily switches from the high beam to the low beam, then drives the swivel actuator toward a target swivel angle according to a position of the detected forward vehicle and, after finishing driving toward the target swivel angle or during driving toward the target swivel angle, starts projection by the high beam.

According to another aspect of the present invention a method of controlling headlamps for a vehicle is provided, wherein the headlamps are configured to be switchable between high beam and low beam, a direction of an optical axis of each of the headlamps being variable in a substantially horizontal plane by use of a swivel actuator, the method including:

detecting a forward vehicle in projection areas of the headlamps;

switching from the high beam to the low beam if the forward vehicle is detected in the projection areas of the headlamps;

driving the swivel actuator toward a target swivel angle according to a position of the detected forward vehicle after switching from the high beam to the low beam; and starting projection by the high beam after finishing driving toward the target swivel angle or during driving toward the target swivel angle.

BRIEF DESCRIPTION OF DRAWINGS

FIG. 6 is a diagram related to FIG. 5 for illustrating swiveling and light distribution switching methods implemented by the control ECU 40 according to the embodiment;

FIG. 7 is a diagram for illustrating a comparable example with respect to the embodiment shown in FIG. 6;

DESCRIPTION OF EMBODIMENTS

In the following, the best mode for carrying out the present invention will be described in detail by referring to the accompanying drawings.

Figure 1:
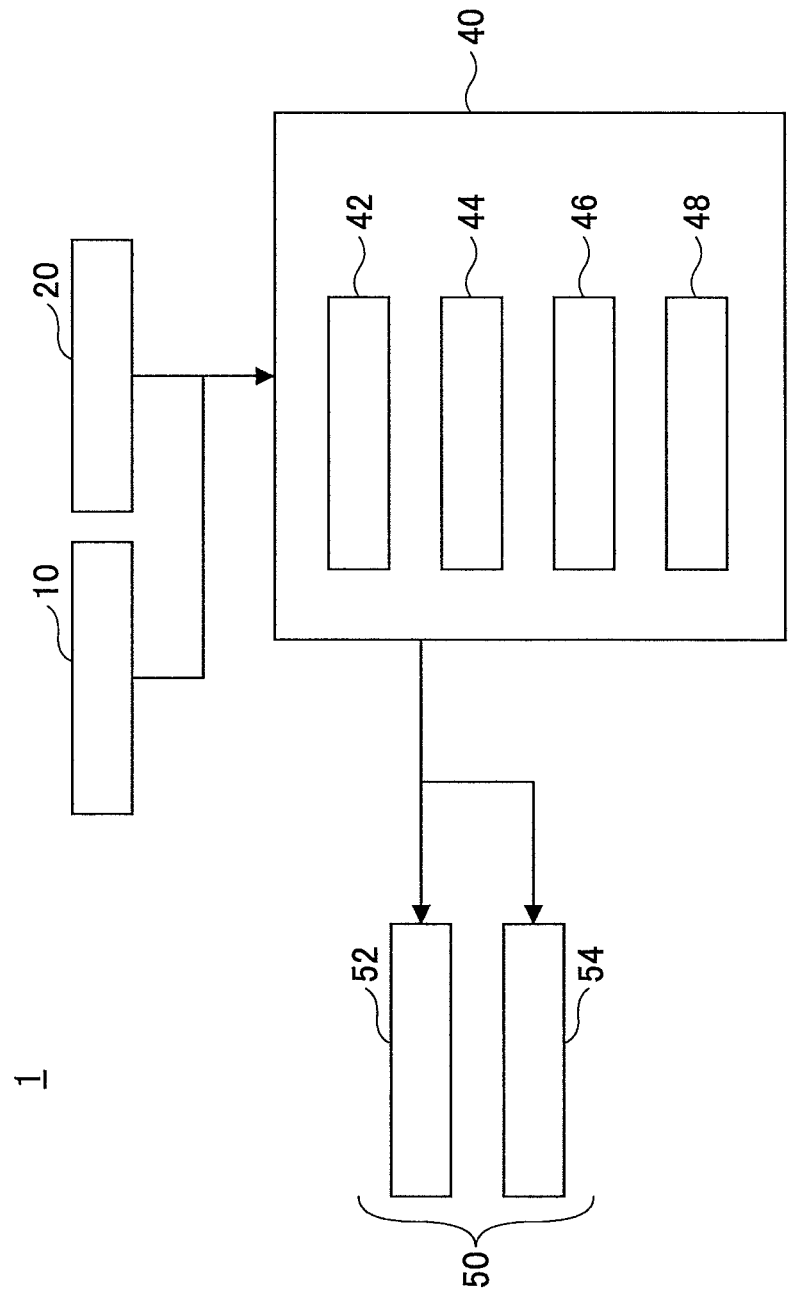
FIG. 1 is a diagram for illustrating a main configuration of a lighting apparatus 1 for a vehicle according to an embodiment.

FIG. 1 is a diagram for illustrating a main configuration of a lighting apparatus 1 for a vehicle according to an embodiment. The lighting apparatus 1 for a vehicle includes an image sensor 10, a switch 20, a control ECU (Electronic Control Unit) 40, and headlamps 50.

The image sensor 10 includes a camera which captures an image of a scene in front of the vehicle (i.e., a front circumstance image) with image sensing elements such as CCD (charge-coupled device) and CMOS (complementary metal oxide semiconductor). The image sensor 10 is installed in the vehicle such that it can image the scene in front of the vehicle. For example, the image sensor 10 is attached to a back side of a room mirror (i.e., a surface facing to the front side of the vehicle). The image sensor 10 may obtain the front circumstance image in real time during driving of the vehicle, and supply the control ECU 40 with the front circumstance image in an image data stream at every predetermined frame cycle. It is noted that the image sensor 10 may be a dedicated sensor for vehicle light distribution control as described below or may be used commonly with other applications (for example, a front monitoring camera, a camera for lane keeping assist). Further, the image sensor 10 may be a camera which obtains either of a color image or a monochrome image.

The switch 20 includes switches related to headlamp operations such as for on/off of the headlamps 50, on/off of the light distribution control of the headlamps 50, etc. The switch 20 may be disposed at an appropriate location in the cabin of the vehicle such as a steering column, for example. It is noted that the light distribution control of the headlamps 50 may be carried out automatically when the headlamps 50 are turned on or may be carried out automatically when the high beam is used.

The control ECU 40 mainly includes a microprocessor that includes a CPU, a ROM, a RAM, etc., which are interconnected via buses (not shown). The control ECU 40 includes as main functions an image recognition part 42, a headlamp controlling part 44, a lampshade controlling part 46 and a swivel controlling part 48. The parts 42, 44, 46, 48 may be implemented by the CPU executing programs stored in a storage device such as ROM. Further, for example, the image recognition part 42 may be implemented by dedicated hardware circuits. Further, the parts 42, 44, 46, 48 are not necessarily incorporated in the same ECU unit and thus may be implemented by several ECUs in cooperation.

The headlamps 50 are provided one on each of left and right sides of the front portion of the vehicle. It is noted that hereinafter in distinguishing between the left and right headlamps 50, symbol 50L is attached to the left side headlamp and symbol 50R is attached to the right side headlamp. The headlamps 50 include the low beam and the high beam for projecting visible light toward a forward area from the vehicle. The low beam and the high beam in each headlamp 50 may be implemented by the respective dedicated lamps or may be implemented by varying the light distribution pattern of one lamp with a lampshade (see FIG. 2). The headlamp 50 includes a swivel actuator 52 and a shade driving actuator 54.

Figure 2:
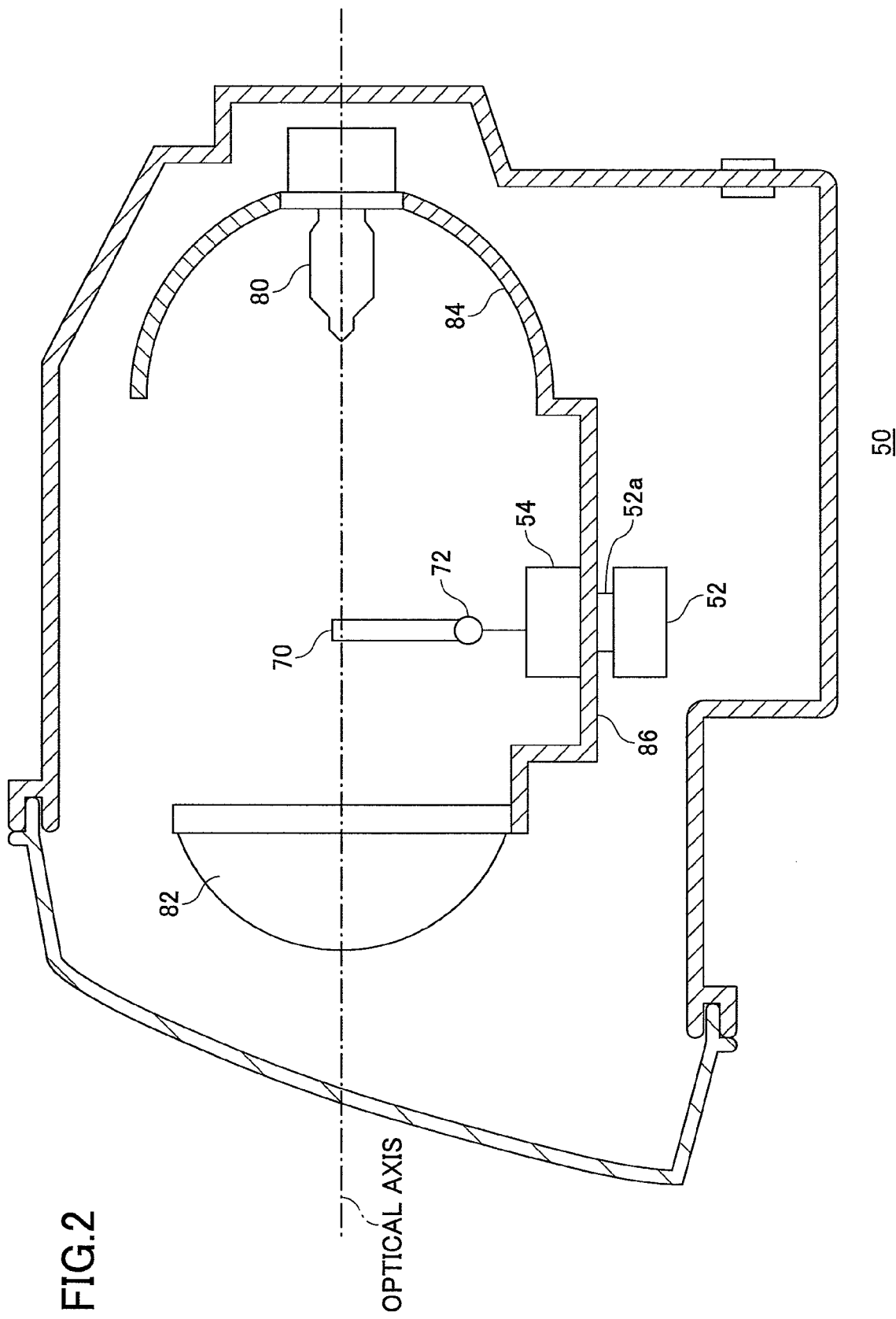
FIG. 2 is a cross-sectional view of an example of a headlamp 50.

FIG. 2 is a cross-section view of an example of the headlamp 50.

In the illustrated example, the headlamp 50 is a projector headlamp and includes a bulb 80 which is a light source, a projector lens 82, a reflector 84 and a holder 86 which holds these items. The lampshade 70 is provided between the reflector 84 and the projector lens 82. The headlamp 50 projects a light distribution pattern by reflecting light emitted from the bulb 80 at the reflector 84 and partly blocking the light going in a forward direction from the reflector 84 with the lampshade 70. The bulb 80 may be an incandescent lamp bulb, a tungsten halogen lamp bulb, a discharge lamp bulb, a LED lamp bulb, etc. The reflector 84 may have a reflecting surface of a substantially ellipsoid shape whose center axis corresponds to an optical axis extending in a longitudinal direction of the vehicle. The projector lens 82 is a planoconvex aspherical lens which has a convex surface on the front side and a plane surface on the back side, and disposed on the optical axis.

The headlamp 50 includes the swivel actuator 52 for varying the direction of the optical axis of the headlamp 50 in a substantially horizontal plane. The swivel actuator 52 is attached to the lower bottom of the holder 86 and rotatably supports the holder 86 around an axis 52a.

The headlamp 50 includes the lampshade 70 for forming the light distribution pattern in which a part of the light emitted from the bulb 80 is blocked. The lampshade 70 includes sub-shades that divides it into halves in a horizontal direction (see FIG. 3). The lampshade 70 is driven by the shade driving actuator 54 to control an opening/closing status of the lampshade 70. In the illustrated example, a rotating element 72, which is driven by the shade driving actuator 54, is attached to the lower ends of the respective sub-shades. When the sub-shades stand upright, a light distribution pattern for the low beam is formed. When the sub-shades are tilted in a substantially horizontal plane by rotating the rotating element 72, a light distribution pattern for the high beam is formed. The construction and functions of the shade are described in detail with reference to FIG. 3.

Figure 3:
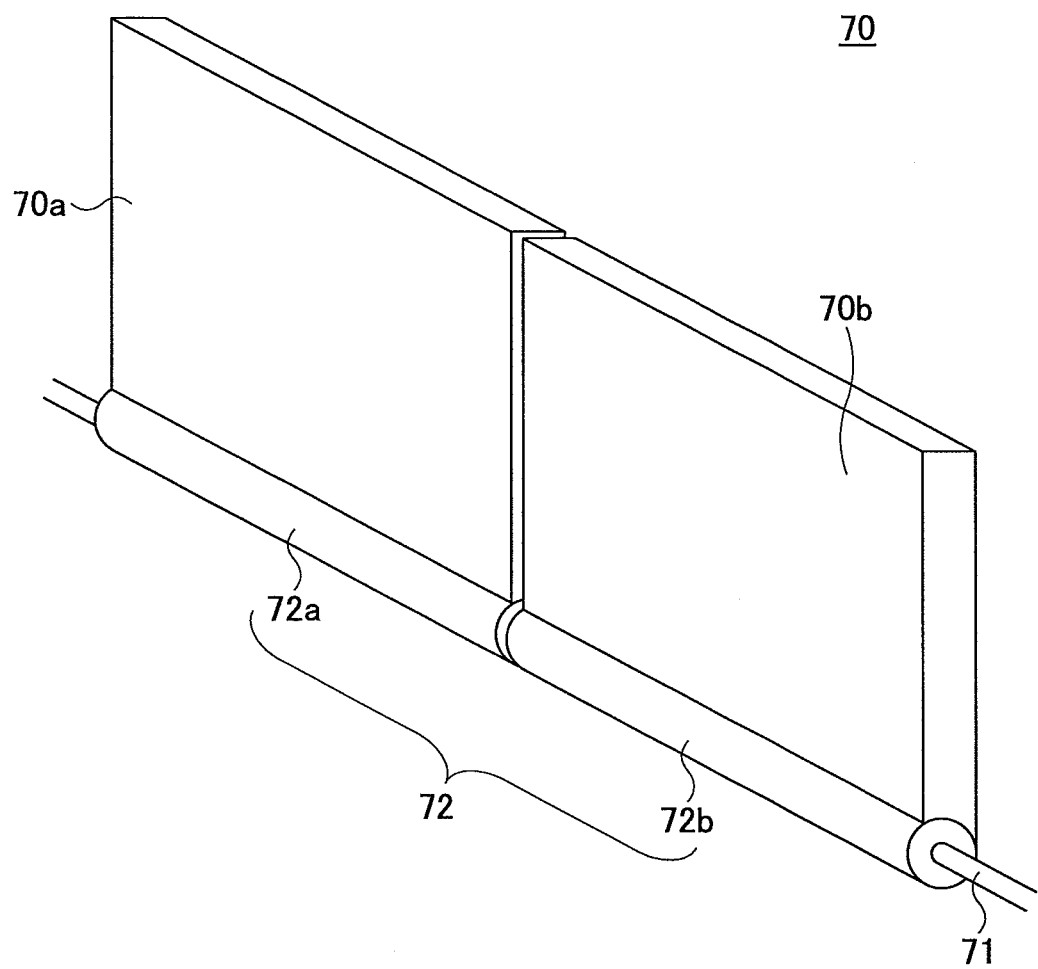
FIG. 3 is a perspective view for diagrammatically showing an example of a lamp shade 70.

FIG. 3 is a perspective view for diagrammatically showing an example of a lamp shade 70. The lampshade 70 is divided into halves to include sub-shades 70a, 70b arranged in a horizontal direction. Rotating elements 72a, 72b, which are rotatably supported by a support axis 71, are attached to the lower ends of the sub-shades 70a, 70b. The support axis 71 is coupled to the holder 86 and can be swiveled together with the holder 86. The rotating elements 72a, 72b are driven to rotate by the shade driving actuators 54 which are provided for them, respectively. It is noted that the sub-shades 70a, 70b may be driven in other ways. The sub-shades 70a, 70b may be switched between the upright status and the tilted down status by means of a reciprocating plunger which is driven by a solenoid (an example of the shade driving actuator 54), for example.

Figure 4:
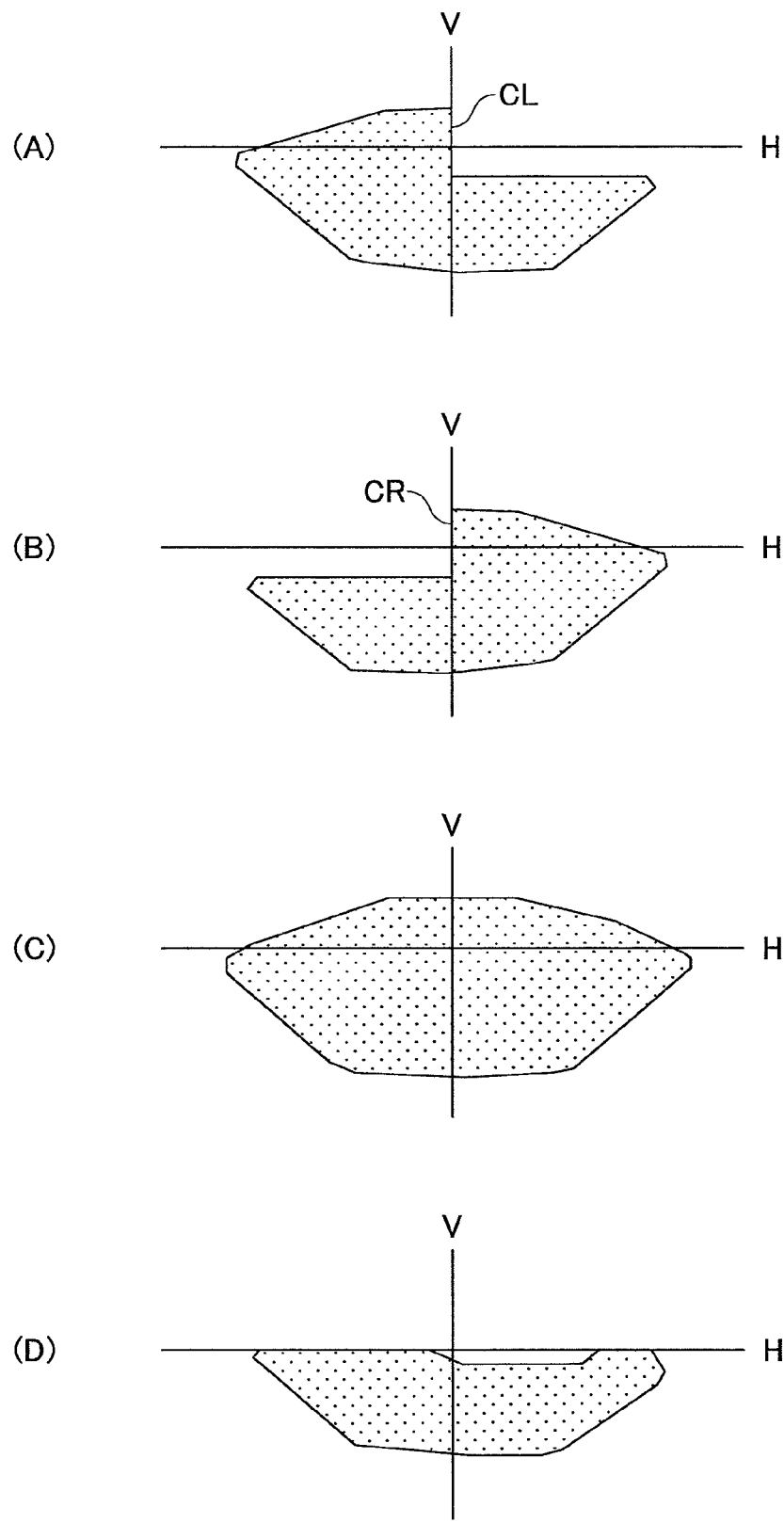
FIG. 4 is a diagram for illustrating representative examples of a light distribution pattern implemented by the lamp shade 70.

FIG. 4 is a diagram for illustrating representative examples of the light distribution pattern implemented by the lamp shade 70. It is noted that in FIG. 4 the light distribution pattern is shown as a light distribution pattern formed on an imaginary vertical screen located at a predetermined distance forward from the vehicle. The line V indicates a vertical line and the line H indicates a horizontal line. It is noted that the center axis of the headlamp 50 is located on the line V.

In FIG. 4, (A) shows an example of a right side partially blocked pattern. The right side partially blocked pattern is a pattern which includes high beam light on the left side. The right side partially blocked pattern is formed by tilting one (a sub-shade located on the inboard side) of the sub-shades 70a, 70b of the lampshade 70 of the left side headlamp 50L in a substantially horizontal plane and making the other (a sub-shade located on the outboard side) upright. Alternatively, the right side partially blocked pattern is formed by tilting one (a sub-shade located on the outboard side) of the sub-shades 70a, 70b of the lampshade 70 of the right side headlamp 50R in a substantially horizontal plane and making the other (a sub-shade located on the inboard side) upright.

In FIG. 4, (B) shows an example of a left side partially blocked pattern. The left side partially blocked pattern is a pattern which includes high beam light on the right side. The left side partially blocked pattern is formed by tilting one (a sub-shade located on the inboard side) of the sub-shades 70a, 70b of the lampshade 70 of the right side headlamp 50R in a substantially horizontal plane and making the other (a sub-shade located on the outboard side) upright. Alternatively, the left side partially blocked pattern is formed by tilting one (a sub-shade located on the outboard side) of the sub-shades 70a, 70b of the lampshade 70 of the left side headlamp 50L in a substantially horizontal plane and making the other (a sub-shade located on the inboard side) upright.

In FIG. 4, (C) shows an example of a high beam pattern generated by the headlamp 50. The high beam pattern is formed by tilting the sub-shades 70a, 70b of the headlamps 50 in a substantially horizontal plane.

In FIG. 4, (D) shows an example of a low beam pattern generated by the left side headlamp 50L. The low beam pattern is formed by making the sub-shades 70a, 70b of the headlamps 50 upright.

Here, referring to FIG. 1 again, the control ECU 40 according to the embodiment is described. The control ECU 40 includes as main functions the image recognition part 42, the headlamp controlling part 44, the lampshade controlling part 46 and the swivel controlling part 48, as described above.

The image recognition part 42 performs image processing of the front circumstance images obtained from the image sensor 10 to detect a forward vehicle (such as a preceding vehicle or an oncoming vehicle) which may exist in front of the vehicle (i.e., the host vehicle). There are various ways of detecting the forward vehicle in the image and an arbitrary way may be adopted. Typically, the forward vehicle is a moving object which emits light from brake lamps (or tail lamps) and the headlamps and includes at its rear portion reflective portions (i.e., reflectors) at which light from the back side is reflected. Thus, the forward vehicle may be detected in the image based on such features. For example, when the features of the light in the image (such as brightness, a color, a size, a pattern, motion, etc.) meet a predetermined condition, the image portion related to the light may be detected as the forward vehicle. More specifically, an example of a way of detecting the forward vehicle may be to perform the image processing of the front circumstance images obtained from the image sensor 10 to detect the light portions in the image (i.e., pixels whose brightness is more than a predetermined value), and then determine whether the respective light portions result from the forward vehicle or disturbance light other than the light from the forward vehicle (such as reflected light at the reflective plate of road signs) based on factors of the brightness, the motion of the light portion (for example, a speed of the lighting object, a traveling direction thereof, etc) and the color (for example, a color of the light emitted from the brake lamps, or a color of the reflected light at the reflective portions). The image recognition part 42 may calculate a position, an azimuth, etc., of the forward vehicle when it detects the existence of the forward vehicle.

The headlamp controlling part 44 switches between an ON state and an OFF state of the headlamps 50 based on the status of the switch 20. It is noted that the headlamp controlling part 44 may perform control for automatically turning on the headlamps 50 when an environment becomes dark.

The lampshade controlling part 46 controls the light distribution pattern with the shade driving actuators 54 when the light distribution control of the headlamps 50 is in its ON state based on the status of the switch 20. Specifically, the lampshade controlling part 46 controls the lamp shades 70 with the shade driving actuators 54 to control the light distribution patterns of the headlamps 50 based on the detected condition of the forward vehicle by the image recognition part 42. Basically, the lampshade controlling part 46 controls, based on the position, the azimuth, etc., of the forward vehicle detected by the image recognition part 42, open/closed statuses of the sub-shades 70a, 70b such that the forward vehicle is not radiated with the high beam. In this way, various light distribution patterns such as shown in FIG. 4 are selectively implemented. It is noted that the control method used in the lampshade controlling part 46 is described hereinafter in detail.

The swivel controlling part 48 controls projection directions of the light distribution patterns (i.e., swivel angles of the headlamps 50) with the swivel actuators 52 when the light distribution control of the headlamps 50 is in its ON state based on the status of the switch 20. Specifically, the swivel controlling part 48 controls the directions of the optical axes of the headlamps 50 with the swivel actuators 52 based on the detected condition of the forward vehicle by the image recognition part 42. Basically, the swivel controlling part 48 controls, based on the position, the azimuth, etc., of the forward vehicle detected by the image recognition part 42, the directions of the optical axes of the headlamps 50 such that the forward vehicle is not radiated with the high beam. It is noted that the control method used in the swivel controlling part 48 is described hereinafter in detail.

Figure 5:
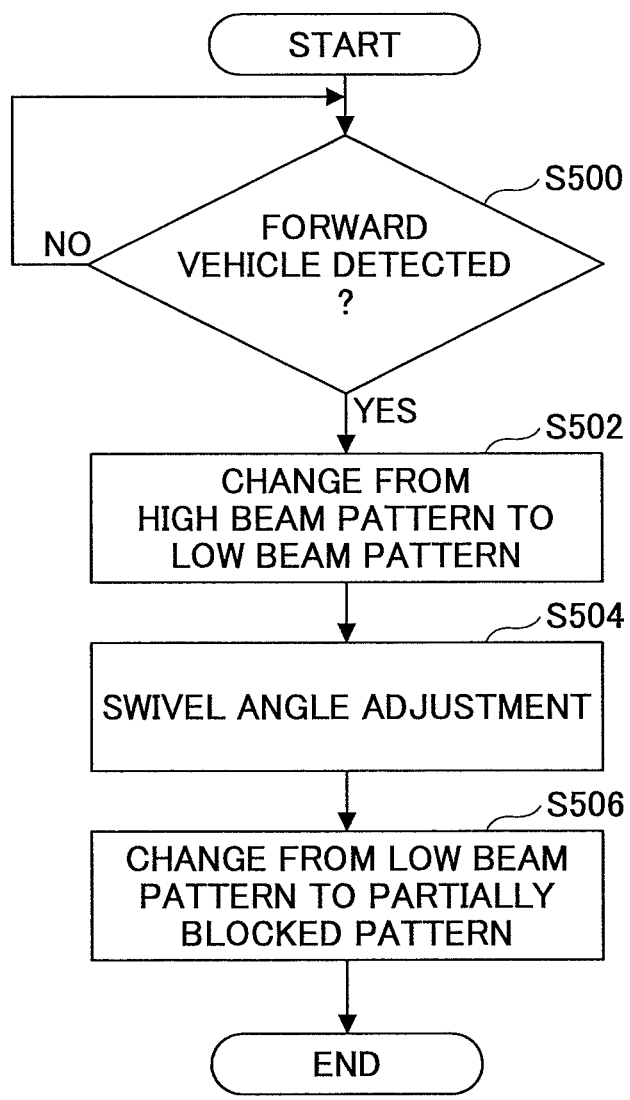
FIG. 5 is an example of a flowchart of a main process executed by a control ECU 40 according to the embodiment.

FIG. 5 is an example of a flowchart of a main process executed by the control ECU 40 according to the embodiment. The process shown in FIG. 5 may be initiated when the headlamps 50 are in their ON states and the light distribution control of the headlamps 50 is in its ON state based on the status of the switch 20, and executed repeatedly every predetermined cycle. FIG. 6 is a diagram related to FIG. 5 for illustrating swiveling and light distribution switching methods implemented by the process shown in FIG. 5. It is noted that in the present example the light distribution patterns of the left and right headlamps 50L, 50R and the projection areas with them are substantially the same, and it is assumed that in FIG. 6, for the sake of simplification of the explanation, the projection areas of the left and right headlamps 50L, 50R overlap each other.

In step 500, the image recognition part 42 performs the image processing of the front circumstance images obtained from the image sensor 10 in real time to determine whether the forward vehicle (such as a preceding vehicle or an oncoming vehicle) which may exist in front of the host vehicle is detected. If the forward vehicle is detected, the process routine goes to step 502. On the other hand, if the forward vehicle is not detected, the process routine returns to step 500. It is noted that the high beam patterns (see (C) in FIG. 4) are formed during a period in which the forward vehicle is not detected.

In step 502, the lampshade controlling part 46 controls the lamp shades 70 to change the light distribution patterns from the high beam patterns (initial patterns) to the low beam patterns. Specifically, the light distribution patterns are changed from the high beam patterns as illustrated in (A) of FIG. 6 to the low beam patterns as illustrated in (B) of FIG. 6.

In step 504, the swivel controlling part 48 determines target swivel angles based on the position of the forward vehicle obtained from the image recognition part 42, and changes the directions of the optical axes of the headlamps 50 with the swivel actuators 52 such that the target swivel angles are implemented. Here, as an example, the target swivel angles are determined such that the forward vehicle is included in blocked portions of the partially blocked patterns and the cut-off lines CL, CR (see (A) and (B) of FIG. 4) are spaced apart by a predetermined distance from the corresponding end portions on the closer sides of the forward vehicle. It is noted that the blocked portions of the partially blocked patterns correspond to portions obtained by subtracting the partially blocked patterns (see (A) and (B) of FIG. 4) from the high beam pattern (see (C) of FIG. 4). Further, in this embodiment, the center axes of the headlamps 50 correspond to the positions of the cut-off lines CL, CR; however, the target swivel angles may be determined based on the positional relationship between the center axes of the headlamps 50 and the forward vehicle.

For example, in the case of the example illustrated in FIG. 6, the forward vehicle is detected on the right side with respect to the center axes (i.e., the optical axes) of the headlamps 50. In this example, the left side partially blocked patterns are formed and used (finally) after the swivel operation, as illustrated in (C) of FIG. 6. In this case, as conceptually illustrated by an arrow in (B) of FIG. 6, the swivel operation is performed such that the cut-off lines CR are spaced apart by a predetermined distance from the end portion on the right side of the forward vehicle while the low beam patterns are maintained. It is noted that at this stage the low beam patterns are maintained and thus the left side partially blocked patterns are not implemented yet.

In step 506, the lampshade controlling part 46 controls the lamp shades 70 to change the light distribution patterns from the low beam patterns to the partially blocked patterns after the swivel operation toward the target swivel angles is completed. In the example illustrated in FIG. 6, the lampshade controlling part 46 controls the lamp shades 70 to change the light distribution patterns from the low beam patterns to the left side partially blocked patterns after the swivel operation toward the target swivel angles is completed. It is noted that, after the partially blocked patterns have been formed, the swivel controlling part 48 controls and adjusts the swivel angles according to the change in the position of the forward vehicle such that the cut-off lines CL, CR are maintained at the positions which are spaced apart by a predetermined distance from the corresponding end portions on the closer sides of the forward vehicle until a predetermined status of loss of the forward vehicle is detected.

In FIG. 7, a comparative example with respect to the example in FIG. 6 is illustrated. The comparative example illustrated in FIG. 7 differs from the present embodiment in that the swivel operation is performed after the left side partially blocked patterns have been formed, as illustrated in (B) of FIG. 7. In other words, while, in the comparative example illustrated in FIG. 7, as conceptually indicated by an arrow in (B) of FIG. 7, the swivel operation causes the left side partially blocked patterns to cross the forward vehicle, in the present embodiment 7, as conceptually indicated by an arrow in (B) of FIG. 6, the low beam patterns cross the forward vehicle at the swivel operation. Thus, according the comparative example illustrated in FIG. 7, there may be glare felt by the driver of the forward vehicle when the swivel operation causes the left side partially blocked patterns to cross the forward vehicle. To the contrary, according the present embodiment, since the low beam patterns cross the forward vehicle at the swivel operation, such glare can be preferably prevented.

Figure 8:
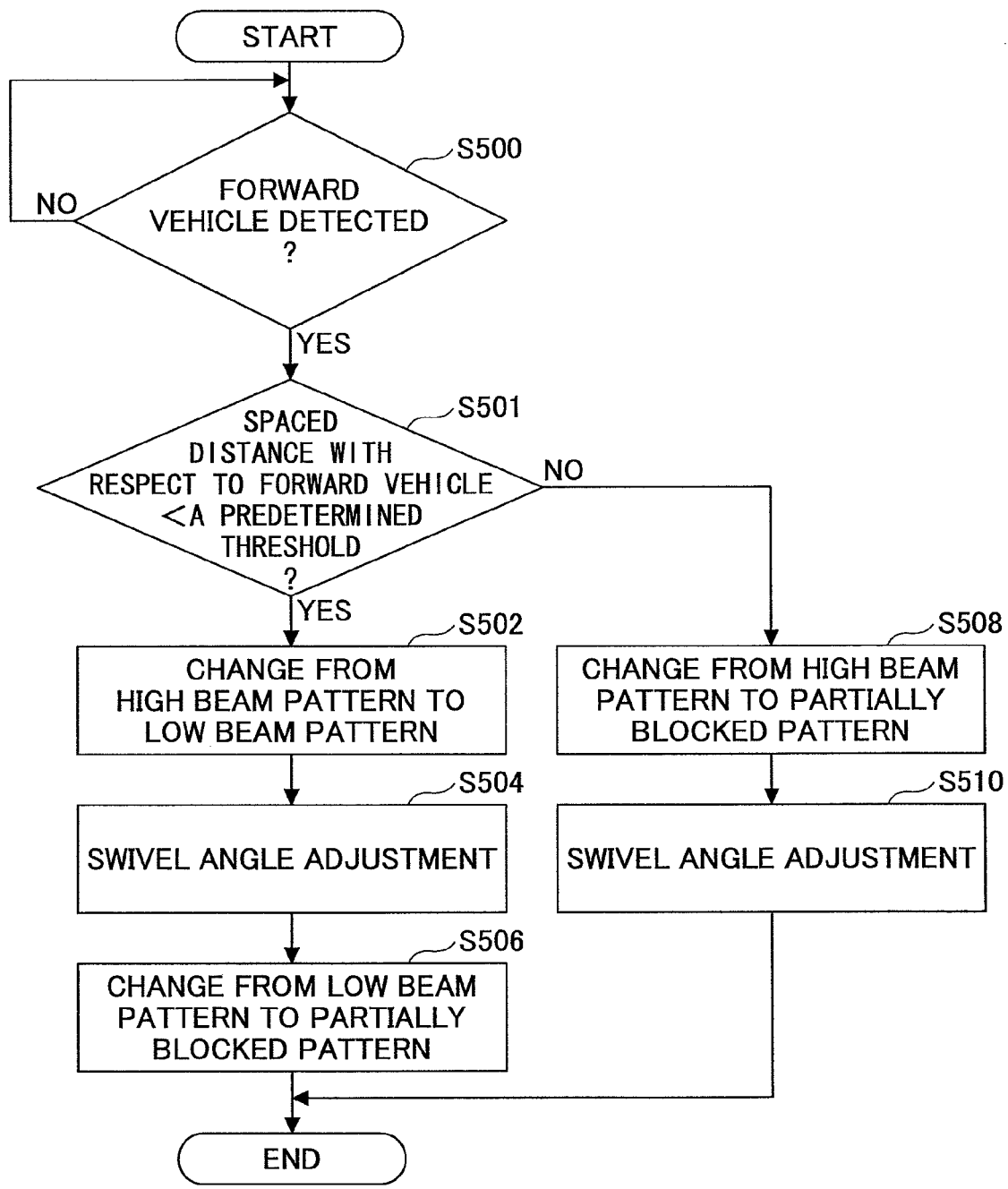
FIG. 8 is another example of a flowchart of a main process executed by a control ECU 40 according to the embodiment.

FIG. 8 is another example of a flowchart of a main process executed by the control ECU 40 according to the embodiment. The process shown in FIG. 8 may be initiated when the headlamps 50 are in their ON states and the light distribution control of the headlamps 50 is in its ON state based on the status of the switch 20, and executed repeatedly every predetermined cycle. The processes of steps 500, 502, 504 and 506 may be the same as those in FIG. 5 and thus the explanation of these processes is omitted.

If the forward vehicle is detected in step 500, the process routine goes to step 501. On the other hand, if the forward vehicle is not detected, the process routine returns to step 500.

In step 501, the image recognition part 42 determines whether a spaced distance with respect to the forward vehicle (a distance between the host vehicle and the forward vehicle) at the time of the detection of step 500 is smaller than a predetermined threshold. The predetermined threshold is for distinguishing the forward vehicle, which is detected when it suddenly appears in front of the host vehicle by an interrupt or lane change, etc., from the forward vehicle, which is detected when it is located further away from the host vehicle such that glare may not be felt by the driver of the forward vehicle even if the high beam patterns are projected. Such a predetermined threshold may be adapted according to the intensity of illumination of the high beam patterns. The spaced distance with respect to the forward vehicle when it is initially detected is smaller than the predetermined threshold, the process routine goes to step 502. On the other hand, if the spaced distance is greater than the predetermined threshold, the process routine goes to step 508.

In steps 502, 504 and 506, the swivel and light distribution switching operations via the formation of the low beam patterns explained above with reference to FIGS. 5 and 6 are performed.

In step 508, the lampshade controlling part 46 controls the lamp shades 70 to change the light distribution patterns from the high-beam patterns to the partially blocked patterns. It is noted that in step 508, such a light distribution switching operation from the high beam patterns (initial patterns) to the low beam patterns, which is performed in step 502, is not performed, but light distribution switching from the high beam patterns (initial patterns) to the partially blocked patterns is performed.

In step 510, the swivel controlling part 48 determines target swivel angles based on the position of the forward vehicle obtained from the image recognition part 42, and changes the directions of the optical axes of the headlamps 50 with the swivel actuators 52 such that the target swivel angles are implemented, as is the case with the step 504. It is noted that the processes of the steps 508 and 510 may be performed in the reversed order.

In this way, according to the process illustrated in FIG. 8, if the forward vehicle is detected first at a relatively long distance from the host vehicle, the swivel and light distribution operations are performed (steps 508 and 510) in the same manner as the comparative example illustrated in FIG. 7, considering the fact that glare may not be felt by the driver of the forward vehicle even if the high beam patterns are projected on the forward vehicle. On the other hand, if the forward vehicle is detected first at a relatively short distance from the host vehicle, the swivel and light distribution switching operations via the formation of the low beam patterns explained above with reference to FIGS. 5 and 6 are performed (steps 502, 504 and 506), considering the fact that glare may be felt by the driver of the forward vehicle if the high beam patterns are projected on the forward vehicle. With this arrangement, if the forward vehicle is detected first at a relatively short distance from the host vehicle, the low beam patterns are maintained in the course of the swivel operation such that the high beam may not cross the position of the forward vehicle. Thus, it is possible to preferably prevent the glare which otherwise could be felt by the driver of the forward vehicle in the course of the swivel operation.

Figure 9:
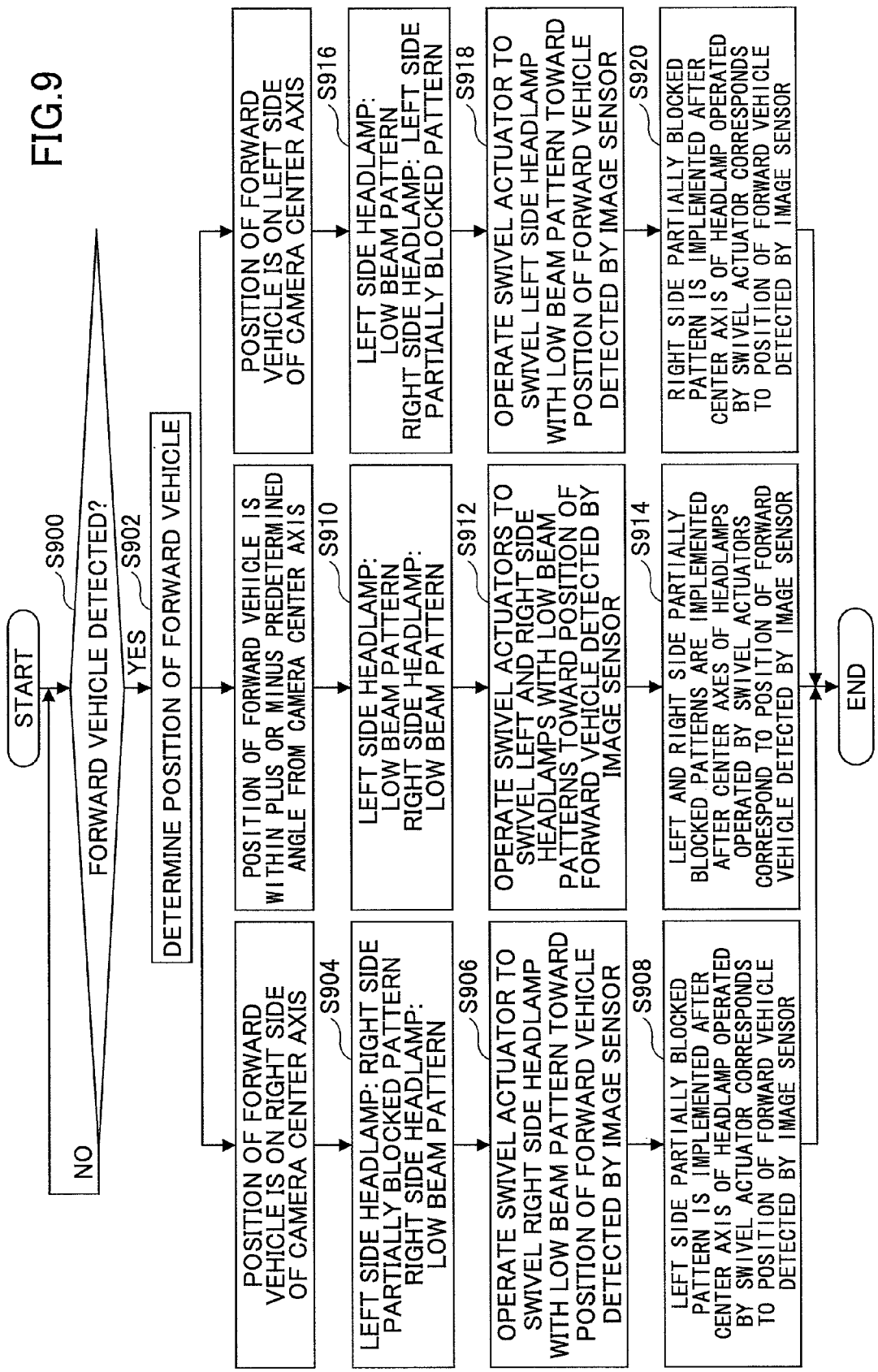
FIG. 9 is yet another example of a flowchart of a main process executed by a control ECU 40 according to the embodiment.
Figure 10:
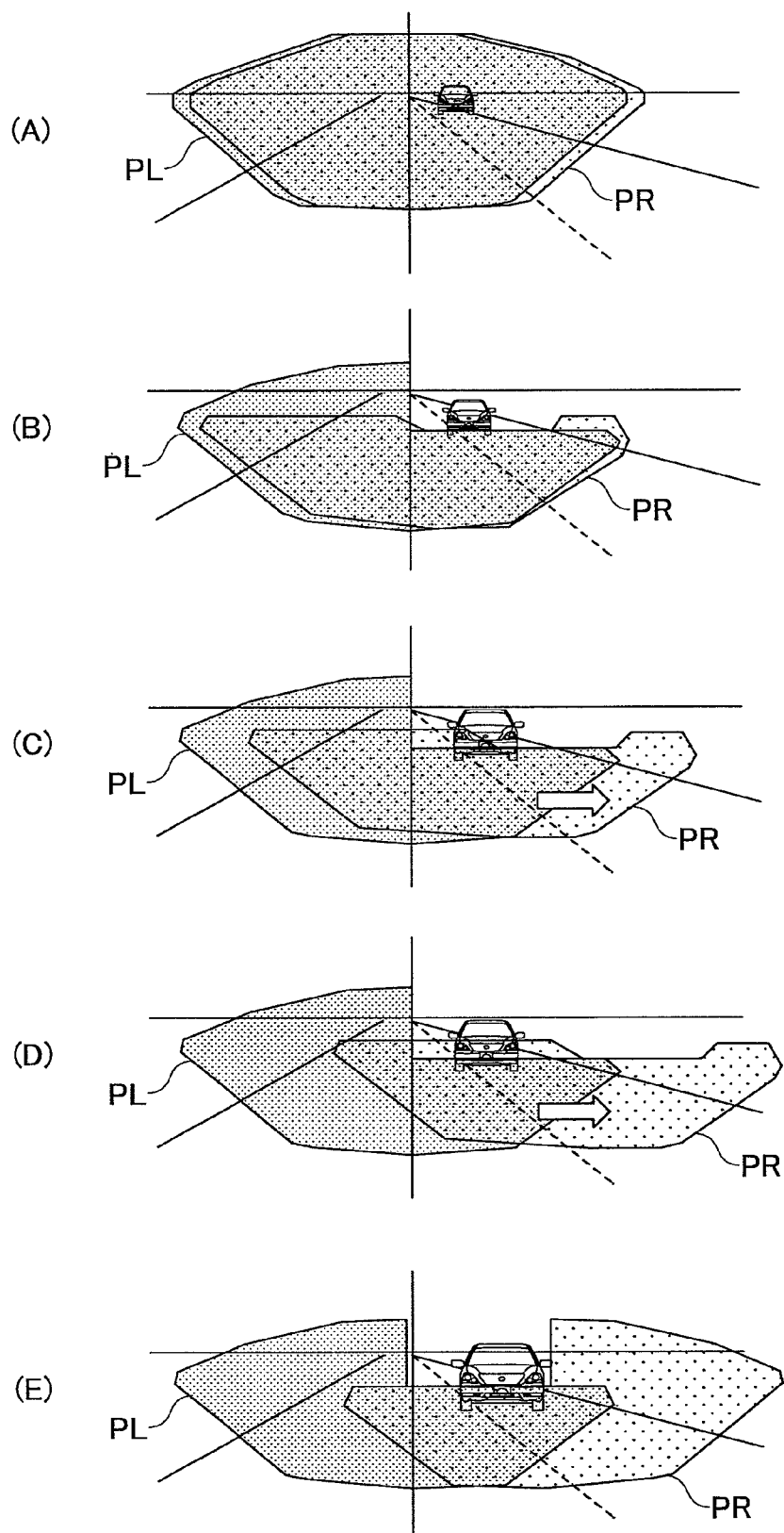
FIG. 10 is a diagram (Part 1) for illustrating swiveling and light distribution switching methods implemented by the process shown in FIG. 9.
Figure 11:
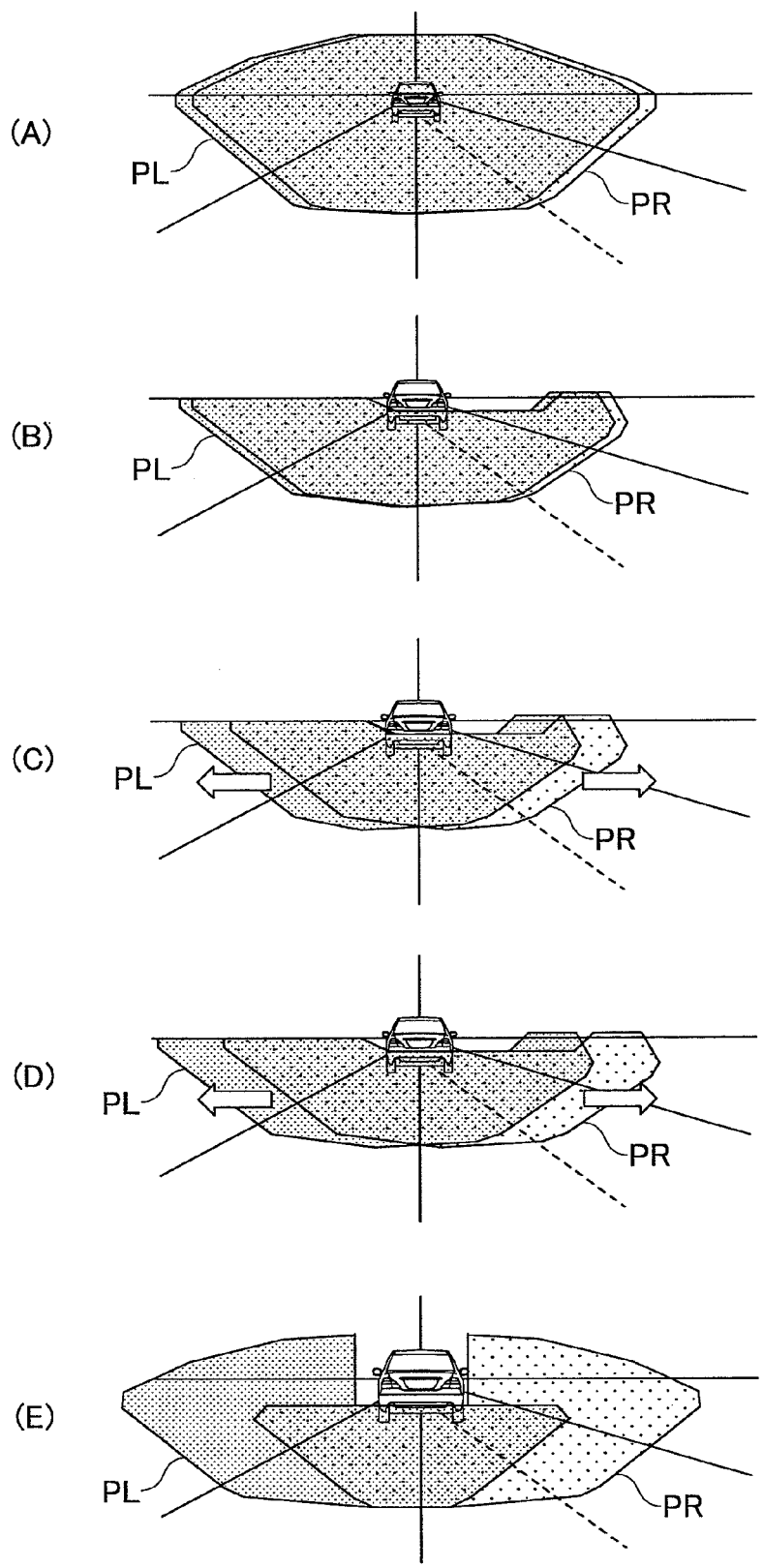
FIG. 11 is a diagram (Part 2) for illustrating swiveling and light distribution switching methods implemented by the process shown in FIG. 9.
Figure 12:
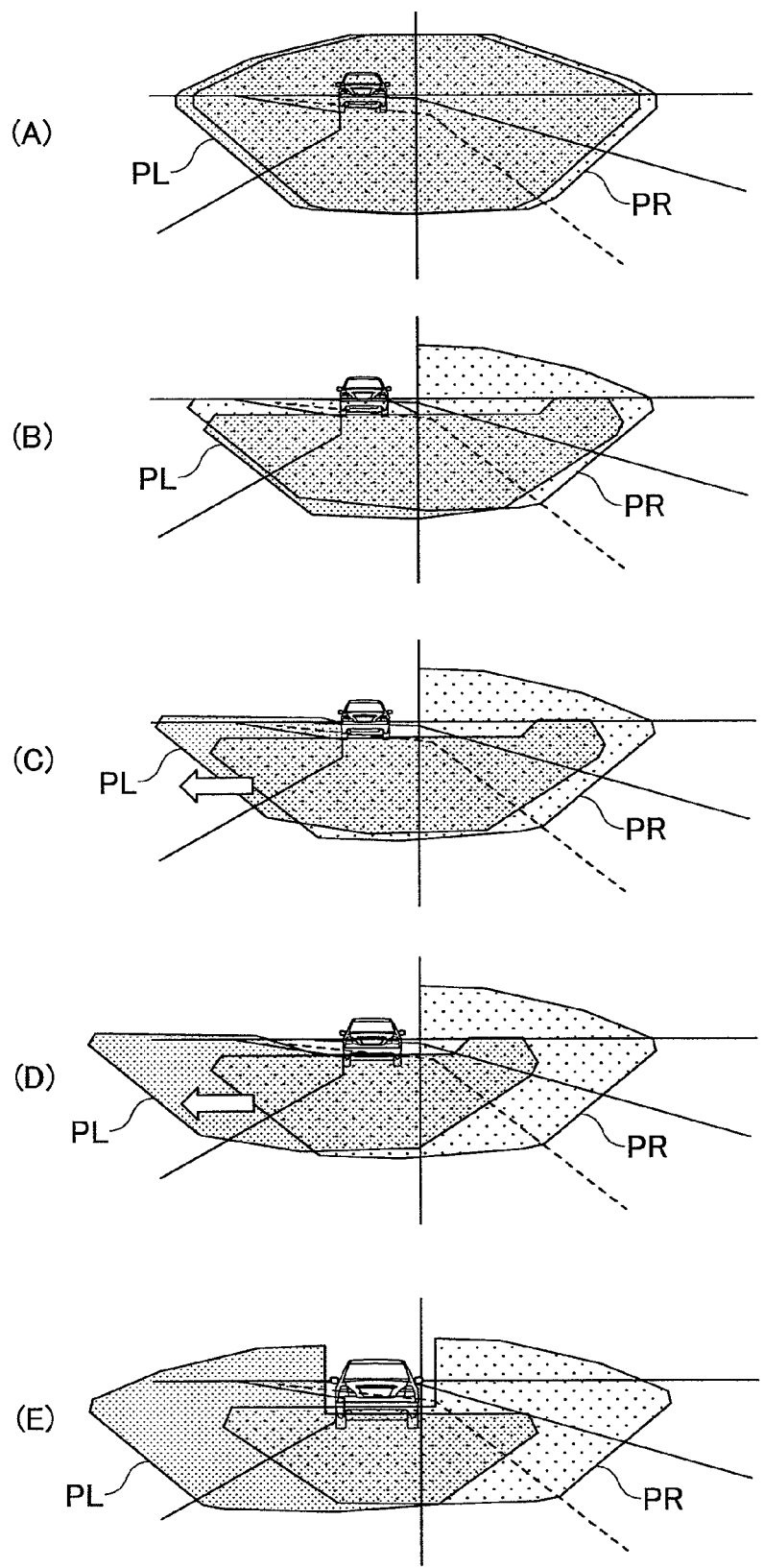
FIG. 12 is a diagram (Part 3) for illustrating swiveling and light distribution switching methods implemented by the process shown in FIG. 9.

FIG. 9 is yet another example of a flowchart of a main process executed by the control ECU 40 according to the embodiment. The process shown in FIG. 9 may be initiated when the headlamps 50 are in their ON states and the light distribution control of the headlamps 50 is in its ON state based on the status of the switch 20, and executed repeatedly every predetermined cycle. FIGS. 10, 11 and 12 are diagrams related to FIG. 9 and for illustrating swiveling and light distribution switching methods implemented by the process shown in FIG. 9. FIG. 10 is a diagram for illustrating swiveling and light distribution switching methods implemented by the processes of steps 904, 906 and 908 in FIG. 9. FIG. 11 is a diagram for illustrating swiveling and light distribution switching methods implemented by the processes of steps 910, 912 and 914 in FIG. 9. FIG. 12 is a diagram for illustrating swiveling and light distribution switching methods implemented by the processes of steps 916, 918 and 920 in FIG. 9. In FIGS. 10, 11 and 12, the light distribution pattern of the left side headlamp 50L is indicated by a reference symbol PL, and the light distribution pattern of the right side headlamp 50R is indicated by a reference symbol PR. It is noted that, in this example, it is assumed that the left and right side headlamps 50L and 50R have the same high beam patterns, low beam patterns and the projection areas implemented by these patterns, as illustrated in FIGS. 10, 11 and 12.

In step 900, the image recognition part 42 performs the image processing of the front circumstance images obtained from the image sensor 10 in real time to determine whether the forward vehicle which may exist in front of the host vehicle is detected. If the forward vehicle is detected, the process routine goes to step 902. On the other hand, if the forward vehicle is not detected, the process routine returns to step 900.

In step 902, the image recognition part 42 determines the position of the forward vehicle detected in step 900. Specifically, the image recognition part 42 determines whether the position of the forward vehicle detected in step 900 is located on the right side by more than a predetermined angle with respect to the camera center axis (i.e., a center axis of the image sensor 10 or a center axis of the vehicle in a back-and-forth direction), located on the left side by more than the predetermined angle with respect to the camera center axis, or located on the center side within the predetermined angle on either side with respect to the camera center axis. The predetermined angle is a threshold for distinguishing the forward vehicle that travels in the same lane as the host vehicle, from the forward vehicle that travels in a different lane from the host vehicle, for example, and the predetermined angle may be determined by adaptation. For example, the predetermined angle may be within the range from 0.5 degrees to 2 degrees. For example, the predetermined angle may be 1 degree.

If the position of the forward vehicle detected in step 902 is located on the right side by more than a predetermined angle with respect to the camera center axis, the process routine goes to steps 904, 906 and 908.

In step 904, as illustrated in (A) and (B) of FIG. 10, the lampshade controlling part 46 controls the lampshade 70 of the left side headlamp 50L to change the light distribution pattern of the left side headlamp 50L from the high beam pattern (initial pattern in (A) of FIG. 10) to the right side partially blocked pattern ((B) of FIG. 10). Further, the lampshade controlling part 46 controls the lampshade 70 of the right side headlamp 50R to change the light distribution pattern of the right side headlamp 50R from the high beam pattern (initial pattern in (A) of FIG. 10) to the low beam pattern ((B) of FIG. 10).

In step 906, as illustrated in (C) of FIG. 10, the swivel controlling part 48 operates the swivel actuator 52 of the right side headlamp 50R such that the optical axis (center axis) of the right side headlamp 50R is directed to the right side of the forward vehicle detected by the image sensor 10 (i.e., the right side with respect to the position of the forward vehicle obtained from the image recognition part 42). At that time, the right side headlamp 50R is swiveled while the low beam pattern is maintained. It is noted that the swivel controlling part 48 may operate the swivel actuator 52 of the left side headlamp 50L such that the optical axis of the left side headlamp 50L is kept at a predetermined location on the left side of the forward vehicle detected by the image sensor 10 (i.e., on the left side with respect to the position of the forward vehicle obtained from the image recognition part 42), although this is not executed in the present embodiment.

In step 908, when the lamp center axis (i.e., the direction of the optical axis) of the right side headlamp 50R substantially corresponds to the position of the forward vehicle detected by the image sensor 10 (precisely, the right end portion of the forward vehicle), as illustrated in (D) of FIG. 10, the lampshade controlling part 46 controls the lampshade 70 of the right side headlamp 50R to change the light distribution pattern of the right side headlamp 50R from the low beam pattern to the left side partially blocked pattern, as illustrated in (E) of FIG. 10. From then on, the swivel controlling part 48 controls and adjusts the swivel angle of the right side headlamp 50R according to the change in the position of the forward vehicle such that the lamp center axis of the right side headlamp 50R is kept at the location which substantially corresponds to the right end portion of the forward vehicle until a predetermined status of loss of the forward vehicle is detected.

On the other hand, if the position of the forward vehicle detected in step 902 is located on the center side within the predetermined angle on either side with respect to the camera center axis (for example, plus or minus 1 degree from the camera center axis), the process routine goes to steps 910, 912 and 914.

In step 910, as illustrated in (A) and (B) of FIG. 11, the lampshade controlling part 46 controls the lampshade 70 of the left side headlamp 50L to change the light distribution pattern of the left side headlamp 50L from the high beam pattern (initial pattern in (A) of FIG. 11) to the low beam pattern ((B) of FIG. 11). Further, the lampshade controlling part 46 controls the lamp shades 70 of the right side headlamp 50R to change the light distribution pattern of the right side headlamp 50R from the high beam pattern (initial pattern in (A) of FIG. 11) to the low beam pattern ((B) of FIG. 11).

In step 912, as illustrated in FIG. 11(C), the swivel controlling part 48 operates the swivel actuator 52 of the right side headlamp 50R such that the optical axis of the right side headlamp 50R is directed to the right side of the forward vehicle detected by the image sensor 10 (i.e., the right side with respect to the position of the forward vehicle obtained from the image recognition part 42). At that time, the right side headlamp 50R is swiveled while the low beam pattern is maintained. Similarly, as illustrated in (C) of FIG. 11, the swivel controlling part 48 operates the swivel actuator 52 of the left side headlamp 50L such that the optical axis of the left side headlamp 50L is directed to the left side of the forward vehicle detected by the image sensor 10 (i.e., to the left side with respect to the position of the forward vehicle obtained from the image recognition part 42). At that time, the left side headlamp 50L is swiveled while the low beam pattern is maintained.

In step 914, when the lamp center axis (i.e., the direction of the optical axis) of the right side headlamp 50R substantially corresponds to the position of the forward vehicle detected by the image sensor 11 (precisely, the right end portion of the forward vehicle), as illustrated in (D) of FIG. 10, the lampshade controlling part 46 controls the lampshade 70 of the right side headlamp 50R to change the light distribution pattern of the right side headlamp 50R from the low beam pattern to the left side partially blocked pattern, as illustrated in FIG. 11(E). Similarly, when the lamp center axis (i.e., the direction of the optical axis) of the left side headlamp 50L substantially corresponds to the position of the forward vehicle detected by the image sensor 10 (precisely, the left end portion of the forward vehicle), as illustrated in (D) of FIG. 11, the lampshade controlling part 46 controls the lampshade 70 of the left side headlamp 50L to change the light distribution pattern of the left side headlamp 50L from the low beam pattern to the right side partially blocked pattern, as illustrated in (E) of FIG. 11. From then on, the swivel controlling part 48 controls and adjusts the swivel angle of the right side headlamp 50R according to the change in the position of the forward vehicle such that the lamp center axis of the right side headlamp 50R is kept at the location which substantially corresponds to the right end portion of the forward vehicle until a predetermined status of loss of the forward vehicle is detected. Similarly, from then on, the swivel controlling part 48 controls and adjusts the swivel angle of the left side headlamp 50L according to the change in the position of the forward vehicle such that the lamp center axis of the left side headlamp 50L is kept at the location which substantially corresponds to the left end portion of the forward vehicle until a predetermined status of loss of the forward vehicle is detected.

Further, if the position of the forward vehicle detected in step 902 is located on the left side by more than the predetermined angle with respect to the camera center axis, the process routine goes to steps 916, 918 and 920.

In step 916, as illustrated in (A) and (B) of FIG. 12, the lampshade controlling part 46 controls the lampshade 70 of the left side headlamp 50L to change the light distribution pattern from the high beam pattern (initial pattern in (A) of FIG. 12) to the low beam pattern ((B) of FIG. 12). Further, the lampshade controlling part 46 controls the lamp shades 70 of the right side headlamp 50R to change the light distribution pattern of the right side headlamp 50R from the high beam pattern (initial pattern in (A) of FIG. 12) to the left side partially blocked pattern ((B) of FIG. 12).

In step 918, as illustrated in (C) of FIG. 12, the swivel controlling part 48 operates the swivel actuator 52 of the left side headlamp 50L such that the optical axis of the left side headlamp 50L is directed to the left side of the forward vehicle detected by the image sensor 10 (i.e., to the left side with respect to the position of the forward vehicle obtained from the image recognition part 42). At that time, the left side headlamp 50L is swiveled while the low beam pattern is maintained. It is noted that the swivel controlling part 48 may operate the swivel actuator 52 of the right side headlamp 50R such that the optical axis of the right side headlamp 50R is kept at a predetermined location on the right side of the forward vehicle detected by the image sensor 10 (i.e., on the right side with respect to the position of the forward vehicle obtained from the image recognition part 42), although this is not executed in the present embodiment.

In step 920, when the lamp center axis (i.e., the direction of the optical axis) of the left side headlamp 50L substantially corresponds to the position of the forward vehicle detected by the image sensor 10 (precisely, the left end portion of the forward vehicle), as illustrated in (D) of FIG. 12, the lampshade controlling part 46 controls the lampshade 70 of the left side headlamp 50L to change the light distribution pattern of the left side headlamp 50L from the low beam pattern to the right side partially blocked pattern, as illustrated in (E) of FIG. 12. From then on, the swivel controlling part 48 controls and adjusts the swivel angle of the left side headlamp 50L according to the change in the position of the forward vehicle such that the lamp center axis of the left side headlamp 50L is kept at the location which substantially corresponds to the left end portion of the forward vehicle until a predetermined status of loss of the forward vehicle is detected.

In this way, according to the process routine illustrated in FIG. 9, the left and right side headlamps 50L and 50R are swiveled in an outboard direction according to the position of the forward vehicle detected by the image sensor 10, using the camera center axis (or the center axis of the vehicle in a back-and-forth direction) as references. Thus, when the swivel operation is completed, it is possible to project the high beam light of the left and right side headlamp 50L and 50R over a relatively wide range on both sides of the forward vehicle detected by the image sensor 10. Further, the low beam patterns are maintained in the course of the swivel operation such that the high beam may not cross the position of the forward vehicle. Thus, it is possible to preferably prevent the glare which otherwise could be felt by the driver of the forward vehicle in the course of the swivel operation. Further, the method of the light distribution control is varied for the left and right side headlamp 50L and 50R according to the relationship between the position of the forward vehicle detected by the image sensor 10 and the camera center axis. Thus, the glare, which otherwise could be felt by the driver of the forward vehicle due to the high beam light, can be prevented while optimized projection areas according to the position of the forward vehicle can be provided.

It is noted that the process illustrated in FIG. 9 may be modified to include the concept of the process illustrated in FIG. 8. Specifically, if the forward vehicle is detected first at a relatively long distance from the host vehicle, the swivel and light distribution operations may be performed in the same manner as the comparative example illustrated in FIG. 7 (i.e., without involving the change to the low beam patterns), while if the forward vehicle is detected first at a relatively short distance from the host vehicle, the swivel and light distribution switching operations via the formation of the low beam patterns explained above with reference to FIG. 9 may be performed, considering the fact that glare may be felt by the driver of the forward vehicle if the high beam patterns are projected on the forward vehicle.

The present invention is disclosed with reference to the preferred embodiments. However, it should be understood that the present invention is not limited to the above-described embodiments, and variations and modifications may be made without departing from the scope of the present invention.

For example, according to the embodiment described above, as a preferred embodiment, the low beam pattern is changed to the left side partially blocked pattern (which includes the high beam light) when the cut-off line CR of the left side partially blocked pattern has reached the position which is apart from the right end portion of the forward vehicle by the predetermined distance, that is to say, when the target swivel angle has been implemented, as described above with reference to the example illustrated in FIGS. 5 and 6, for example. However, the timing of the change from the low beam pattern to the partially blocked pattern need not be precise. The timing of the change from the low beam pattern to the partially blocked pattern may be after the center axes of the headlamps 50 or the cut-off lines CL and CR of the partially blocked patterns have finished crossing the position of the driver of the forward vehicle. Further, the timing of the change from the low beam pattern to the partially blocked pattern may be after the swivel operation has been started but before the center axes of the headlamps 50 or the cut-off lines CL and CR of the partially blocked patterns have finished crossing the position of the driver of the forward vehicle. Even in such a case, it is possible to reduce time during which the glare may be felt by the driver of the forward vehicle in comparison with the comparative example illustrated in FIG. 7, and thus obtain the effect to some extent.

Further, according to the embodiment described above, the partially blocked pattern can be formed in addition to the low beam pattern and high beam pattern; however, the present invention can be applied to the configuration in which only the low beam pattern and high beam pattern are formed. In such a configuration in which only the low beam pattern and high beam pattern are formed, if the forward vehicle is detected, the swivel operation is performed such that the end portion of the high beam pattern on the camera center side goes outside of the forward vehicle in a lateral direction, for example. In this case, similarly, when the forward vehicle is detected, the high beam pattern may be changed to the low beam pattern, the swivel operation toward the target swivel angle(s) may be performed, and then the low beam pattern may be changed to the high beam pattern at the time of completion of the swivel operation toward the target swivel angles or at some midpoint thereof.

Further, according to the embodiment described above, the projection areas of the left side headlamp 50L with the high beam pattern and the low beam pattern are substantially the same as those of the right side headlamp 50R with the high beam pattern and the low beam pattern, respectively; however, the projection areas of the left and right side headlamps 50L and 50R with the high beam patterns and the low beam patterns may be arranged on the left and right sides, respectively, with respect to the camera center axis (or the center axis of the vehicle in a back-and-forth direction), for example. In this case, the projection areas of the left and right side headlamps 50L and 50R with the high beam patterns and the low beam patterns may have overlapped areas near the camera center axis.

Further, according to the embodiment described above, the low beam and the high beam are generated by changing the light distribution pattern from the single bulb by means of the lampshade 70; however, the low beam and the high beam may be generated by respective dedicated bulbs. In other words, the headlamps 50 may have four bulbs in total. In this case, the lampshade 70 may include a fixed shade for forming the low beam and sub-shades divided into halves in a horizontal direction for changing the high beam projection area (movable sub-shades). In this case, similarly, when the forward vehicle is detected, the high beam pattern may be changed to the low beam pattern, the swivel operation toward the target swivel angle(s) may be performed, and then the low beam pattern may be changed to a pattern including the high beam light at the time of completion of the swivel operation toward the target swivel angles or at some midpoint thereof.

What is claimed is:

1. A lighting apparatus for a vehicle comprising:
   headlamps configured to be switchable between high beam and low beam, wherein a direction of an optical axis of each of the headlamps is variable in a substantially horizontal plane by use of a swivel actuator; and
   a controller configured to control the headlamps;
   wherein when the controller detects a forward vehicle in projection areas of the headlamps, the controller temporarily switches from the high beam to the low beam, then drives the swivel actuator toward a target swivel angle according to a position of the detected forward vehicle and, after finishing driving toward the target swivel angle or during driving toward the target swivel angle, starts projection by the high beam.

2. The lighting apparatus of claim 1, wherein each of the headlamps includes a shade which is driven such that:
   a light distribution pattern of the high beam is varied,
   the controller is configured to drive the shade to generate the light distribution pattern in which high beam light is partly blocked when the controller detects the forward vehicle in the projection areas of the headlamps, and
   the target swivel angle is determined based on the position of the detected forward vehicle such that the detected forward vehicle is included in a blocked portion in the light distribution pattern.

3. The lighting apparatus of claim 1, wherein each of the headlamps includes a shade which is driven such: that a light distribution pattern of the high beam is varied,
   the headlamps include a left side headlamp and a right side headlamp provided on left and right sides of the host vehicle, and
   wherein the controller is configured such that:
      when the controller detects the forward vehicle at a position in a right direction, wherein a line connecting the position and the host vehicle forms an angle which is greater than or equal to a predetermined angle with a center longitudinal axis of the host vehicle, the controller, with respect to the left side headlamp, maintains the high beam and drives the shade to generate the light distribution pattern in which high beam light is partly blocked such that the forward vehicle is included in the blocked portion and, the controller, with respect to the right side headlamp, temporarily switches from the high beam to the low beam, then drives the swivel actuator toward the target swivel angle according to the position of the detected forward vehicle and, after finishing driving toward the target swivel angle or during driving toward the target swivel angle, starts projection by the high beam; and
      when the controller detects the forward vehicle at a position in a left direction, wherein a line connecting the position and the host vehicle forms an angle which is greater than or equal to a predetermined angle with the center longitudinal axis of the host vehicle, the controller, with respect to the right side headlamp, maintains the high beam and drives the shade to generate the light distribution pattern in which the high beam light is partly blocked such that the forward vehicle is included in the blocked portion and, the controller, with respect to the left side headlamp, temporarily switches from the high beam to the low beam, then drives the swivel actuator toward the target swivel angle according to the position of the detected forward vehicle and, after finishing driving toward the target swivel angle or during driving toward the target swivel angle, starts projection by the high beam.

4. The lighting apparatus of claim 1, wherein when the controller detects the forward vehicle at a position in a left or right direction, wherein a line connecting the position and the host vehicle forms an angle which is smaller than a predetermined angle with a center longitudinal axis of the host vehicle, the controller, with respect to a left side headlamp and a right side headlamp, temporarily switches from the high beam to the low beam, then drives the swivel actuator toward the target swivel angle according to the position of the detected forward vehicle and, after finishing driving toward the target swivel angle or during driving toward the target swivel angle, starts projection by the high beam.

5. The lighting apparatus of claim 2, wherein when the controller detects the forward vehicle at a position in a left or right direction, wherein a line connecting the position and the host vehicle forms an angle which is smaller than a predetermined angle with a center longitudinal axis of the host vehicle, the controller, with respect to a left side headlamp and a right side headlamp, temporarily switches from the high beam to the low beam, then drives the swivel actuator toward the target swivel angle according to the position of the detected forward vehicle and, after finishing driving toward the target swivel angle or during driving toward the target swivel angle, starts projection by the high beam.

6. The lighting apparatus of claim 3, wherein when the controller detects the forward vehicle at a position in a left or right direction, wherein a line connecting the position and the host vehicle forms an angle which is smaller than a predetermined angle with a center longitudinal axis of the host vehicle, the controller, with respect to a left side headlamp and a right side headlamp, temporarily switches from the high beam to the low beam, then drives the swivel actuator toward the target swivel angle according to the position of the detected forward vehicle and, after finishing driving toward the target swivel angle or during driving toward the target swivel angle, starts projection by the high beam.

7. The lighting apparatus of claim 1, wherein when the controller detects the forward vehicle in the projection areas of the headlamps, the controller implements the target swivel angle by driving the swivel actuator such that the direction of the optical axis of each of the headlamps is changed outwardly in a left or right direction from the side of the center longitudinal axis of the host vehicle.

8. The lighting apparatus of claim 1, wherein when the controller detects the forward vehicle in the projection areas of the headlamps and within a predetermined distance from the host vehicle, the controller temporarily switches from the high beam to the low beam, then drives the swivel actuator toward the target swivel angle according to the position of the detected forward vehicle and, after finishing driving toward the target swivel angle or during driving toward the target swivel angle, starts projection by the high beam; and when the controller detects the forward vehicle in the projection areas of the headlamps and out of the predetermined distance from the host vehicle, the controller maintains the high beam, drives the shade to generate the light distribution pattern in which high beam light is partly blocked such that the forward vehicle is included in the blocked portion, and drives the swivel actuator toward the target swivel angle according to the position of the detected forward vehicle.

9. A method of controlling headlamps for a vehicle, wherein the headlamps are configured to be switchable between high beam and low beam, a direction of an optical axis of each of the headlamps being variable in a substantially horizontal plane by use of a swivel actuator, the method comprising:

detecting a forward vehicle in projection areas of the headlamps;

switching from the high beam to the low beam when the forward vehicle is detected in the projection areas of the headlamps;

driving the swivel actuator toward a target swivel angle according to a position of the detected forward vehicle after switching from the high beam to the low beam; and starting projection by the high beam after finishing driving toward the target swivel angle or during driving toward the target swivel angle.

\* \* \* \* \*